United States Patent [19]

Lindner et al.

[11] Patent Number: 4,545,415
[45] Date of Patent: * Oct. 8, 1985

[54] PNEUMATIC TIRE TREAD

[75] Inventors: Daniel J. Lindner, Canal Fulton; Ronald L. Loeffler, Akron, both of Ohio; Harold D. Fetty, Asheville, N.C.; Jeffrey L. Plauny, Stow, Ohio

[73] Assignee: The Goodyear Tire & Rubber Company, Akron, Ohio

[*] Notice: The portion of the term of this patent subsequent to Jan. 10, 2001 has been disclaimed.

[21] Appl. No.: 536,060

[22] Filed: Sep. 26, 1983

[51] Int. Cl.$^4$ ................................................ B60C 1/08
[52] U.S. Cl. .............................. 152/209 R; D12/151
[58] Field of Search .......... 152/209 R, 209 D, 209 A; D12/144, 151

[56] References Cited

U.S. PATENT DOCUMENTS

| D. 167,779 | 9/1952 | Steadman | D12/149 |
| D. 215,396 | 9/1969 | Pond | D12/151 |
| D. 236,888 | 9/1975 | Verdier | D12/147 |
| D. 254,542 | 3/1980 | Hitzky | D12/151 |
| 3,674,077 | 7/1972 | Verdier | 152/209 R |
| 3,705,613 | 12/1972 | Verdier | 152/209 R |
| 4,424,844 | 1/1984 | Fontaine | 152/209 R |

FOREIGN PATENT DOCUMENTS 0064934 11/1982 European Pat. Off. ........ 152/209 D

Primary Examiner—Michael Ball
Attorney, Agent, or Firm—L. R. Drayer

[57] ABSTRACT

A pneumatic radial tire having a tread portion comprising a first plurality of grooves, the grooves in the central region of the tread following a particular path across the tread. The grooves are spaced circumferentially apart a distance of about 2 to 3% of the circumference of the outer surface of the tread. A second plurality of grooves are provided in the central portion each of which follow substantially the same path as the first plurality of grooves and are substantially the mirror images of the first plurality of grooves. The second plurality of main grooves are also spaced circumferentially apart a distance in the range of about 2 to 3% of the circumference of the tire.

9 Claims, 3 Drawing Figures

PNEUMATIC TIRE TREAD

The foregoing abstract is not to be taken as limiting the invention of this application, and in order to understand the full and nature and extent of the technical nature of this application, reference must be made to the accompanying drawings and the following detailed description.

BACKGROUND OF THE INVENTION

This invention relates to tires, and more particularly to an improved tread pattern for radial pneumatic passenger tires.

The tread portion of a pneumatic tire generally comprises a plurality of grooves which form ground engaging elements. The particular size and shape of these elements contribute significantly to the overall performance of the tire. Generally tires are designed to provide a particular performance for example, winter performance, high traction performance or high speed performance. The obtaining of one particular performance characteristic is at odds at obtaining other performance characteristics. For example, the obtaining of good winter performance is obtained at the sacrifice of noise and ride comfort. While those which have good dry traction are obtained at the sacrifice of good winter performance.

Applicants have developed a tread pattern which provides acceptable all season performance while maintaining good ride, noise and handling characteristics of tires normally associated for use solely in the warmer seasons.

DETAILED DESCRIPTION OF THE INVENTION

Figure 1:
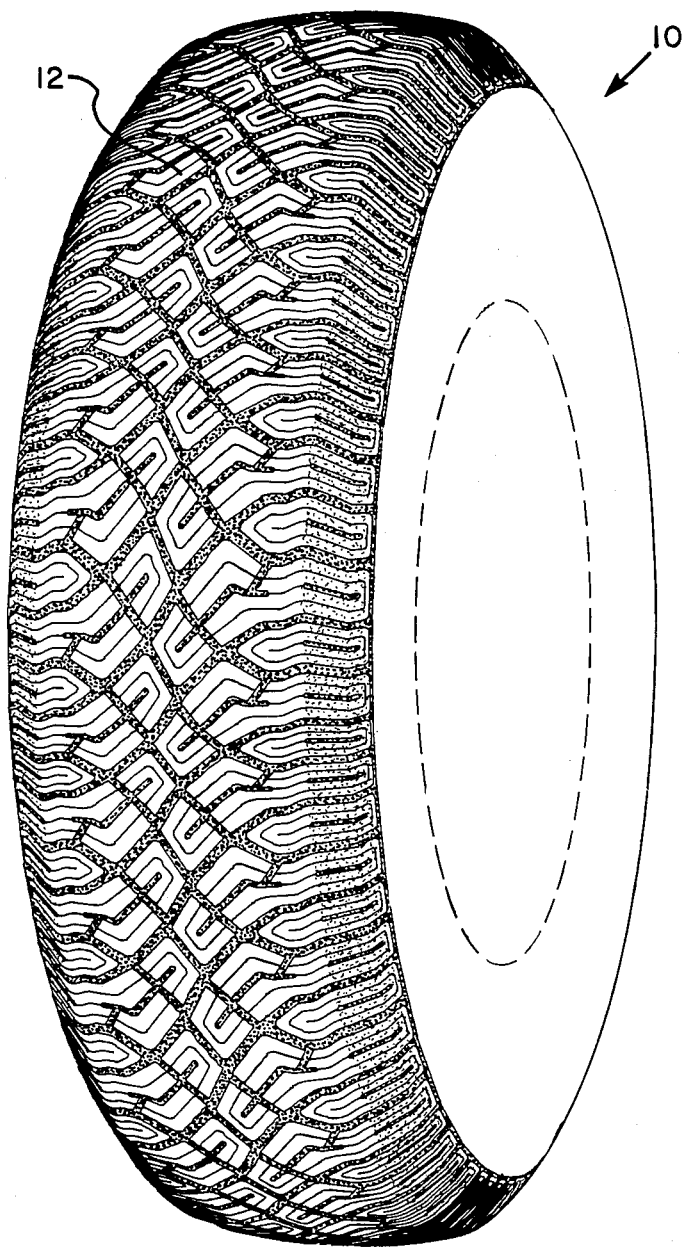
FIG. 1 is a perspective view of a tire embodying a tread made in accordance with the present invention.
Figure 2:
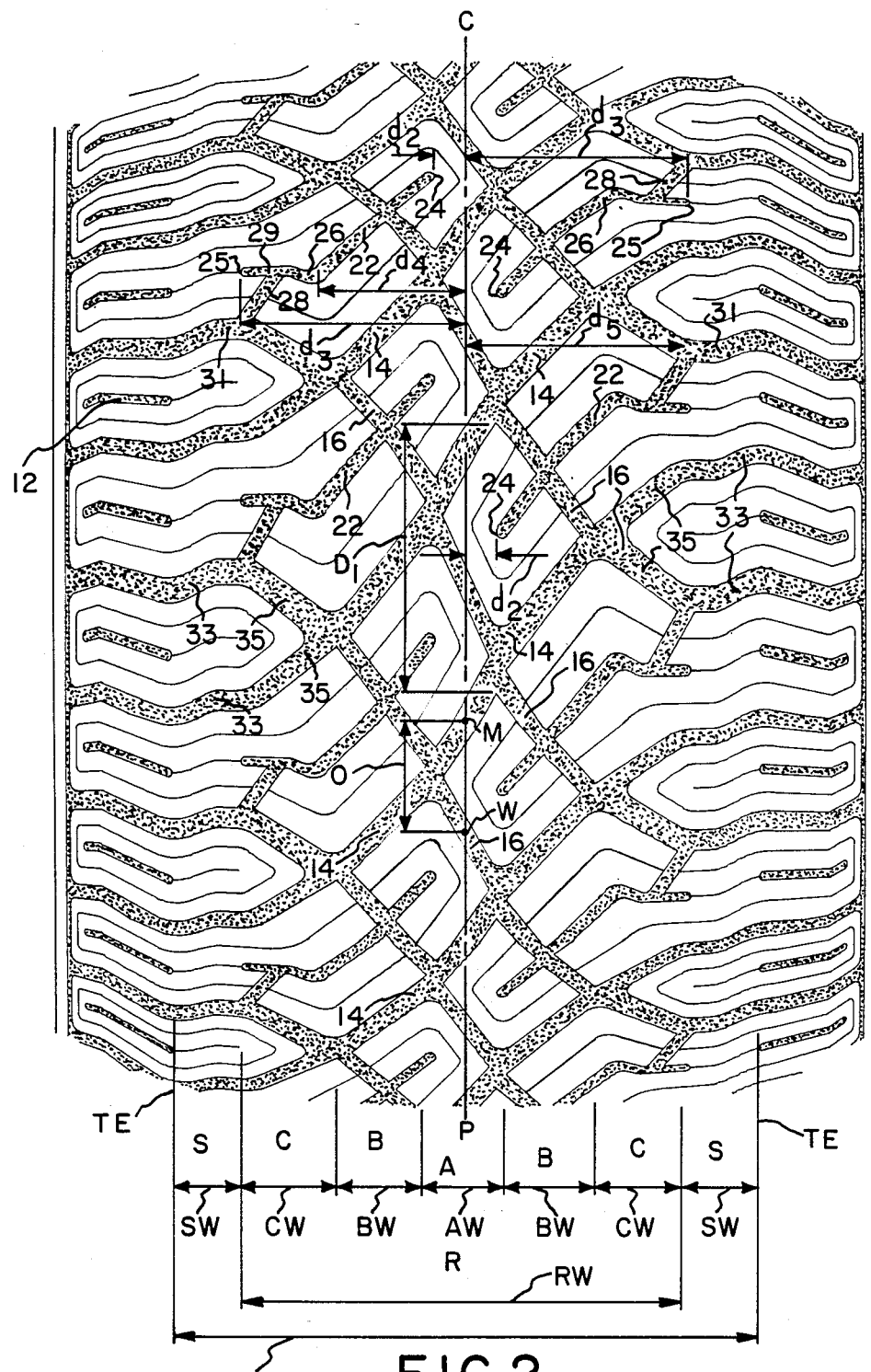
FIG. 2 is an enlarged fragmentary view of a portion of the tread of FIG. 1.

Referring to FIGS. 1 and 2, there is illustrated a pneumatic tire 10 made in accordance with the present invention. The tire 10 is of the radial type construction and designed for use on passenger vehicles. For the purposes of this invention, a radial pneumatic tire shall be considered a tire wherein the cords of the carcass reinforcement lie at an angle from about 75° to 90° with respect to the mid-circumferential centerplane CP of the tire.

The ground-engaging portion 12 is provided with central region R having a width RW which extends substantially an equal distance on either side of the mid-circumferential centerplane CP. The width RW of the central region ranges from about 60% to 80% of the tread width TW of the ground engaging tread portion 12. In the particular embodiment illustrated, the width RW is about 65% of the tread width TW. For the purposes of this invention, the tread width TW is the distance across the ground-engaging tread portion as taken from the footprint of the tire measured perpendicular to the mid-circumferential centerplane of the tire.

The central region is provided with a first plurality of grooves 14 which extend continuously across the central region. Each of said grooves being substantially identical to each other and generally following the path formed by the following relationship:

$$Y = Ax + Bx^2 + Cx^3 + D$$

wherein,
$A = -0.44$
$B = -0.048$
$C = -0.095$
$D = -0.025$ x is the distance along the circumference of the tire starting from where the groove 14 meets the mid-circumferential centerplane of the tire as measured parallel to the mid-circumferential centerplane of the tire;

Y is the distance from where the groove 14 crosses the mid-circumferential centerplane CP axially outward thereof to a point on the path as measured perpendicular to the mid-circumferential centerplane CP.

The first plurality of grooves 14 are spaced circumferentially apart a distance $D_1$ in the range of about 2% to 3% of the circumference of the tire as taken at the mid-circumferential centerplane of the tire mounted and inflated to design inflation pressure.

The central region is further provided with a second plurality of main grooves 16 which follow substantially the same path as the first plurality of grooves except it is the mirror image of the path which grooves 14 follow.

Each of the grooves 14 are circumferentially offset from their respective adjacent grooves 16 by a distance 0, as measured at the points MW where each of the adjacent grooves 14, 16 cross the mid-circumferential centerplane CP. The distance 0 ranges from about 25% to 50% of the distance $D_1$, preferably from about 40% to 50%. In the particular embodiment illustrated, the distance 0 is about 50% of the distance $D_1$. The offsetting of grooves 14 and 16 contribute to improved noise quality and traction performance and minimizes any concentration of grooves in any particular circumferential region in the tire. The grooves 14,16 cross at a point axially outwardly of the mid-circumferential centerplane CP.

The central region is flanked on either side by shoulder regions S each having a width SW. The first plurality of grooves 14 and second plurality of grooves 16 extend outwardly to the tread edges TE. The grooves 14 and 16 in the shoulder regions extend in a substantially axial direction with respect to the mid-circumferential centerplane CP of the tire. Preferably as illustrated in FIG. 2 the grooves 14 and 16 extend in a slightly zig-zag manner so as to minimize irregular wear in the shoulder region of the tire.

The path which grooves 14 and 16 follow in the central region R can be characterized as having a central portion A, a pair of first intermediate portions B and a pair of second intermediate portions C. The central portion A being disposed in the center of the tire, and extending a substantially equal distance on either side of the mid-circumferential plane CP. The grooves 14 and 16 in the central portion A being oriented at an angle in the range of about 20° to 40° with respect to the mid-circumferential centerplane CP of the tire. In the particular embodiment illustrated, the groove 14 is oriented at an angle of about 30°. The width AW of central portion A is in the range of 5% to 15% of the tread width TW. In the particular embodiment illustrated, the width AW is about 13% of TW.

Disposed on either side axially outward of the central portion A adjacent thereto is a first intermediate portion B having a width BW. The grooves 14 and 16 in the first intermediate portions B being oriented at an angle in the range of about 35° to 55°. In the particular embodiment illustrated, the grooves 14,16 in first intermediate portion B are oriented at an angle of about 45°. The width BW of each first intermediate portion B ranges from about 10% to 20% of the tread width TW and in the particular embodiment illustrated, is about 15% of the tread width TW.

Disposed axially adjacent each first intermediate portion B is a second intermediate portion C wherein the grooves 14,16 are oriented at an angle in the range of about to 45° to 65° with respect to the mid-circumferential centerplane CP of the tire. The width CW of each second intermediate portion C ranges from about 10% to 15% of the width of the tread. In the particular embodiment illustrated, the width CW is about 12% of TW and the grooves 14,16 are oriented at an angle of about 55°. The combined width of central portion A, pair of first intermediate portions B and pair second intermediate portion C is no greater than about 70%, preferably 80%, of the width TW of the ground-engaging tread portion 12 and preferably at least 60% of the tread width TW.

The ground-engaging tread portion 12 may be further provided with a plurality of intermediate grooves 22, one being disposed between each pair of first plurality of grooves 14. The axially inner end of intermediate groove 22 extends from a first point 24 axially outward terminating at a second point 25. The first point 24 is spaced from the mid-circumferential plane of the tire a distance $d_2$ in the range of 5% to 10% of the tread width TW. In the particular embodiment illustrated, the first point 24 is spaced a distance $d_2$ of approximately 8%. The second point 25 is spaced from the mid-circumferential centerplane a distance $d_3$ no greater than about 40% of the tread width TW. The intermediate groove 22 from point 24 to a third intermediate point 26 follows substantially the same path as the adjacent groove 14. The third intermediate point 26 being spaced from the mid-circumferential centerplane CP a distance $d_4$ in the range of about 20 to 30% of the tread width TW. In the particular embodiment illustrated, the distance $d_4$ is approximately 25% of the tread width TW. From the third point 26 axially outward to the second point 25 the intermediate groove 22 follows a substantially radial path, that is, substantially perpendicular to the mid-circumferential centerplane CP of the tire.

In the particular embodiment illustrated, the ground-engaging tread portion 12 is further provided with a connecting groove 28 which extends from point 29 which is disposed between the second and third points 25,26, respectively of intermediate groove 22 in the same general circumferential direction as the adjacent groove 14 until connecting with the next second groove 16. The fourth point 29 being substantially midway between the second and third points of intermediate groove 22. Said connecting groove 18 being oriented at an angle in the range of 40° to 60° with respect to the mid-circumferential centerplane of the tire. The connecting groove 28 meeting the groove 16 at a point 31 which is spaced a distance $d_5$ from the mid-circumferential centerplane CP no greater than about 40% of the tread width TW.

The tire may be further provided with very narrow grooves 30 (known in the art as blades or sipes) in the ground-engaging elements formed by the grooves. These blades are well known by those in the art and can be easily distinguished from the grooves 14, 16, 22 and 28 in that the blades 30 are much thinner in cross-section and generally close up when in the footprint of tire whereas the grooves 14, 16, 22 and 28 stay open so as to provide water channeling passages in the ground-engaging tread portion 12.

The groove arrangement of the present invention is such that a substantially uniform net to gross is provided across the tread portion. The net to gross for any circumferential extending zone having a width of at least 10% of the width TW varies by no more than about 10% of the total net to gross of the tread portion. For the purposes of this invention, the net to gross is the ratio between that portion of the tire which comes in contact with the ground versus the total available area of the tread in the footprint of the tire. It is desirable that there be a substantially uniform net to gross distribution as you proceed from tread edge to tread edge. This contributes to tire uniformity and good ride characteristics. However, it is sometimes desirable that the net to gross be slightly greater in the central portion A (that is, that portion which extends from 5% to 10% on either side of the mid-circumferential centerplane CP) and shoulder portions S (or shoulder regions) of the tread. In such case the net to gross in such an area may be from 5% to 10% greater than the total net to gross of the tread portion 12.

The tire 10 may be further provided, if so desired, with tie bars (not shown) located in the base of grooves 14 or 16 in the shoulder regions or second intermediate portions C connecting adjacent relief elements at the areas indicted by numerals 33,35. It is, of course, understood that it is not necessary to put tie bars at each location. There may be as many tie bars as so desired. For the purposes of this invention, a tie bar comprises elastomeric material which connects adjacent elements. The placement of these tie bars enhance the rigidity of the adjacent relief elements. The height of the tie bar is generally no greater than approximately 60% of the groove depth, preferably no greater than about 30% of the groove depth. Generally, the tie bar extends along the length of the groove a short distance, generally a distance no greater than about one inch.

Figure 3:
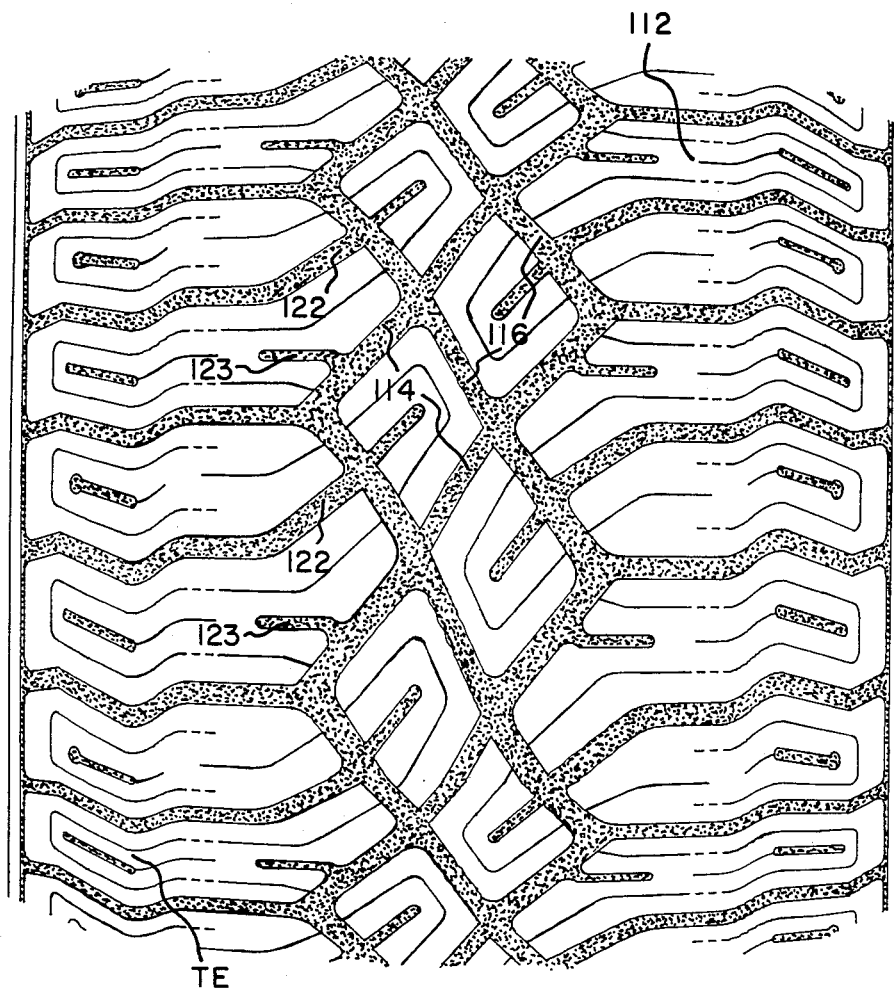
FIG. 3 is an enlarged fragmentary view of a modified tread pattern made in accordance with the present invention.

Referring to FIG. 3 there is illustrated a modified form of the present invention. There is illustrated a ground-engaging portion 112 having a first plurality of grooves 114. The tread portion 112 further comprises a second plurality of grooves 116, and grooves 114, 116 are similar to grooves 14, 16 respectively of FIG. 2. The grooves 114 and 116 follow the same relationship as the grooves 14 and 16, respectively, with regard to the angle orientation in the central portion A, intermediate portions B, second intermediate portions C and shoulder regions S. In this embodiment, there is provided an intermediate groove 122. However, it can be readily seen that intermediate groove 122 is similar to groove 22 of FIG. 1 except that intermediate groove 122 extends axially outwardly to the tread edge TE. In this embodiment there is provided a second intermediate groove 123 between intermediate groove 122 and groove 114 This second intermediate groove 123 extends from groove 114 axially outward in a substantially radial manner approximately half the distance from the first groove to the tread edge. The grooves 114 and 116 are circumferentially offset in the same manner as grooves 14 and 16.

Of main importance to the present invention is that there be provided a first and second plurality of grooves. While it is preferable to provide intermediate grooves, they may be omitted if so desired.

Certain representative embodiments and details have been shown for the purposes of illustrating the invention. It should be apparent to those skilled in the art that various other changes and modifications may be made therein without departing from the scope of the present invention.

We claim:

1. A radial pneumatic passenger tire comprising a ground engaging tread portion, said tread portion having a pair of lateral tread edges, said tread portion comprising a first plurality of main grooves which follow substantially the same path across the tread from tread edge to tread edge, each of said main grooves having a central portion, a pair of first intermediate portions, a pair of second intermediate portions and a pair of shoulder portions, said central portion being disposed substantially in the axially central portion of the tread portion and having a width in the range of 5 percent to 15 percent of the width of the tread portion, each of said first plurality of main grooves in said central portion being oriented at an angle in the range of 20° to 40° with respect to the mid-circumferential centerplane of the tire, one of said first intermediate portions is disposed adjacent each axial side of said central portion, the width of each of said first intermediate portions being in the range of about 10 percent to 20 percent of the width of the tread, said first plurality of main grooves in said first intermediate portion being oriented at an angle that is greater than said central portion angle by about 15°, one of said second intermediate portions is disposed axially outwardly and adjacent each of said first intermediate portions, said first plurality of main grooves in said second intermediate portion being oriented at an angle that is greater than the first intermediate portion angle by about 10°, the width of said second intermediate portion being from about 10 percent to 15 percent of the width of said tread, the width of said central portion, said pair of first intermediate portions and said pair of second intermediate portions being no greater than about 80 percent of the width of the tread, one of said shoulder portions is provided axially outwardly and adjacent each of said second intermediate portions, said first plurality of main grooves in said shoulder region being oriented at an angle axially outwardly toward the closest respective tread edge in a substantially axial direction, said first plurality of main grooves being spaced circumferentially apart a distance in the range of about two percent to three percent of the circumference of the radially outer surface of said tread portion taken at the mid-circumferential centerplane of said tire, a second plurality of main grooves are provided each of which follow substantially the same path across the tread from tread edge to tread edge, each of said second plurality of main grooves have a configuration which is substantially the mirror image of said first plurality of grooves, said first plurality of main grooves and said second plurality of main grooves extend axially outward from said central portion to the tread edge in a substantially axial direction, said first plurality of main grooves are circumferentially offset from said second plurality of main grooves, as measured at mid-circumferential centerplane, a distance in the range of 25 percent to 50 percent of the distance which said first plurality of main grooves are spaced circumferentially apart.

2. A radial pneumatic passenger tire according to claim 1 further characterized by a first plurality of intermediate grooves, one intermediate groove being disposed between each pair of circumferentially adjacent grooves of said first plurality of grooves, each of said intermediate grooves extend from a first point spaced a first distance from the mid-circumferential centerplane of the tire to a second point spaced a second distance further from the mid-circumferential centerplane of the tire, said first distance ranging from about five percent to 10 percent of the width, said second distance being no greater than about 40 percent of the tread width, from said first point to a third intermediate point between said first point and said second point said intermediate groove follows substantially the same path as said adjacent first plurality of main grooves, said third point being spaced from the mid-circumferential centerplane a third distance said third distance being in the range of 20 to 30 percent of the tread width TW, from said third point axially outwardly to said second point said intermediate groove follows the substantially radial direction.

3. A tire according to claim 2 further characterized by a second plurality of connecting grooves extending from each of said first intermediate grooves at a fourth point disposed between said second and third points, each of said plurality of connecting grooves extending in the same general circumferential direction as said first intermediate groove connecting to the next circumferentially adjacent groove of said first main grooves, said connecting grooves being oriented at an angle in the range from about 40° to 60° with respect to the mid-circumferential centerplane of the tire extending axially outward toward the closest respective tread edge, the axially outer end of each of said connecting grooves terminating at a point spaced from the mid-circumferential centerplane a distance no greater than about 40 percent of the tread width from the mid-circumferential centerplane.

4. A tire according to claim 3 further characterized by the net to gross of said tread portion in said shoulder portions and said central portion being about 5 to about 10 percent greater than the total net to gross of the tire tread pattern.

5. A tire according to claim 3 further characterized by the net to gross of said tread portion in said central portion having a net to gross of about 5 percent to 10 percent greater than the total net to gross of said tread pattern.

6. A tire according to claim 1 further characterized by the net to gross of said tread portion for any circumferential zone having a width of at least 10 percent of the width of said tread being no more than 10 percent greater than the total net to gross of the tire tread portion.

7. A tire according to claim 1 further characterized by said first plurality of main grooves are circumferentially offset from said second plurality of main grooves at the mid-circumferential centerplane a distance in the range of 40 to 50 percent of the distance said first plurality of main grooves are spaced circumferentially apart.

8. A tire according to claim 1 further characterized by said first plurality of main grooves being circumferentially offset from said second plurality of main grooves at the mid-circumferential centerplane a distance of about 45 percent of the distance said first plurality of main grooves are spaced circumferentially apart.

9. A tire according to claim 1 wherein said central portion, said pair of first intermediate portions and said pair of second intermediate portions have a combined width of about 65 percent of the width, of said tread portion.

* * * * *